United States Patent
Cairo et al.

(10) Patent No.: US 7,750,493 B2
(45) Date of Patent: Jul. 6, 2010

(54) WIND TURBINE ASSEMBLIES AND SLIP RING ASSEMBLIES FOR WIND BLADE PITCH CONTROL MOTORS

(75) Inventors: Ronald Ralph Cairo, Greer, SC (US); Sujith Sathian, Greer, CA (US)

(73) Assignee: General Electric Company, Schenectady, NY (US)

( * ) Notice: Subject to any disclaimer, the term of this patent is extended or adjusted under 35 U.S.C. 154(b) by 267 days.

(21) Appl. No.: 11/838,438

(22) Filed: Aug. 14, 2007

(65) Prior Publication Data
US 2009/0045627 A1 Feb. 19, 2009

(51) Int. Cl.
*F03D 9/00* (2006.01)
*H02P 9/04* (2006.01)
*H01R 39/00* (2006.01)
*H01R 39/38* (2006.01)
*H01R 39/40* (2006.01)
*H01R 39/18* (2006.01)
*H02K 13/00* (2006.01)

(52) U.S. Cl. .............. 290/55; 439/18; 439/23; 439/26; 310/40 MM; 310/232; 310/239; 310/245; 310/246; 310/247; 310/248

(58) Field of Classification Search ............ 290/44, 290/55; 310/232, 40 MM; 439/18, 23
See application file for complete search history.

(56) References Cited

U.S. PATENT DOCUMENTS

| | | | | |
|---|---|---|---|---|
| 2,473,526 A * | 6/1949 | Hood et al. | ............. | 439/26 |
| 2,509,931 A * | 5/1950 | Krantz | ............. | 439/26 |
| 2,924,800 A * | 2/1960 | Scarborough | ............. | 439/26 |
| 3,243,866 A * | 4/1966 | Pandapas et al. | ............. | 29/597 |
| 3,398,387 A * | 8/1968 | Wendell | ............. | 439/26 |
| 3,671,791 A * | 6/1972 | Muller et al. | ............. | 310/219 |
| 3,698,646 A * | 10/1972 | Robba et al. | ............. | 239/591 |
| 3,860,312 A * | 1/1975 | Gordon, Jr. | ............. | 439/31 |
| 3,925,151 A * | 12/1975 | Klepfer | ............. | 376/415 |
| 4,068,909 A * | 1/1978 | Jacobson et al. | ............. | 439/24 |
| 4,142,008 A * | 2/1979 | DeBolt | ............. | 427/590 |
| 4,296,345 A * | 10/1981 | Haberl | ............. | 310/219 |
| 4,398,113 A * | 8/1983 | Lewis et al. | ............. | 310/232 |
| 4,410,821 A * | 10/1983 | Kurt | ............. | 310/227 |
| 4,415,635 A * | 11/1983 | Wilsdorf et al. | ............. | 428/611 |
| 4,476,163 A * | 10/1984 | Lersmacher et al. | ............. | 427/249.6 |
| 4,500,804 A * | 2/1985 | Akiyama | ............. | 310/40 MM |
| 4,502,931 A * | 3/1985 | Asano et al. | ............. | 204/192.34 |
| 4,544,215 A * | 10/1985 | Fritsch | ............. | 439/13 |
| 4,800,311 A * | 1/1989 | Weldon et al. | ............. | 310/178 |
| 4,850,880 A * | 7/1989 | Zayat et al. | ............. | 439/11 |
| 4,858,304 A * | 8/1989 | Weldon et al. | ............. | 29/598 |
| 4,870,311 A * | 9/1989 | Chase et al. | ............. | 310/232 |

(Continued)

*Primary Examiner*—J Gon
*Assistant Examiner*—Pedro J Cuevas
(74) *Attorney, Agent, or Firm*—Cantor Colburn LLP

(57) ABSTRACT

Slip ring assemblies for controlling pitch of a wind driven blade such as those utilized in wind turbines can include a series of grooves disposed about an outer perimeter of a rotating portion, each one of the grooves comprising a first planar surface intersecting with a second planar surface at an angle of 75 to 105 degrees, and a concavely rounded bottom portion at the intersection of the first and planar surfaces. The rotating portion of the slip ring can be formed of a bronze material and may include a graphite coating. Also disclosed herein are wind turbine assemblies employing the slip ring assemblies.

17 Claims, 6 Drawing Sheets

U.S. PATENT DOCUMENTS

| | | | |
|---|---|---|---|
| 4,984,938 A * | 1/1991 | Scott et al. | 405/259.1 |
| 5,178,645 A * | 1/1993 | Nakamura et al. | 51/293 |
| 6,049,967 A * | 4/2000 | Feuer et al. | 29/597 |
| 6,089,875 A * | 7/2000 | Iwata et al. | 439/26 |
| 6,222,297 B1 * | 4/2001 | Perdue | 310/232 |
| 6,266,876 B1 * | 7/2001 | Lawson et al. | 29/885 |
| 6,283,638 B1 * | 9/2001 | Feuer et al. | 384/537 |
| 6,356,002 B1 * | 3/2002 | Witherspoon et al. | 310/232 |
| 6,400,057 B2 * | 6/2002 | Vesper et al. | 310/232 |
| 6,502,298 B1 * | 1/2003 | Witherspoon et al. | 29/597 |
| 6,517,357 B1 * | 2/2003 | Athanasiou et al. | 439/26 |
| 6,903,482 B2 * | 6/2005 | Rehder et al. | 310/227 |
| 6,975,045 B2 | 12/2005 | Kurachi et al. | 290/44 |
| 7,449,794 B2 * | 11/2008 | Guey et al. | 290/44 |
| 7,481,655 B2 * | 1/2009 | Horst et al. | 439/24 |
| 7,528,497 B2 * | 5/2009 | Bertolotti | 290/55 |
| 7,559,767 B2 * | 7/2009 | Coleman et al. | 439/13 |
| 2003/0129059 A1 * | 7/2003 | Nord | 416/160 |
| 2004/0100159 A1 * | 5/2004 | Rehder et al. | 310/232 |
| 2005/0000084 A1 * | 1/2005 | Barbet et al. | 29/596 |
| 2007/0013194 A1 | 1/2007 | Calley | 290/44 |
| 2007/0281499 A1 * | 12/2007 | Muro et al. | 439/26 |
| 2008/0081488 A1 * | 4/2008 | Horst et al. | 439/26 |
| 2008/0121162 A1 * | 5/2008 | Erstad | 114/230.12 |
| 2008/0143110 A1 * | 6/2008 | Guey et al. | 290/44 |
| 2008/0284584 A1 * | 11/2008 | Coleman et al. | 340/531 |
| 2008/0292467 A1 * | 11/2008 | Borgen | 416/244 R |

* cited by examiner

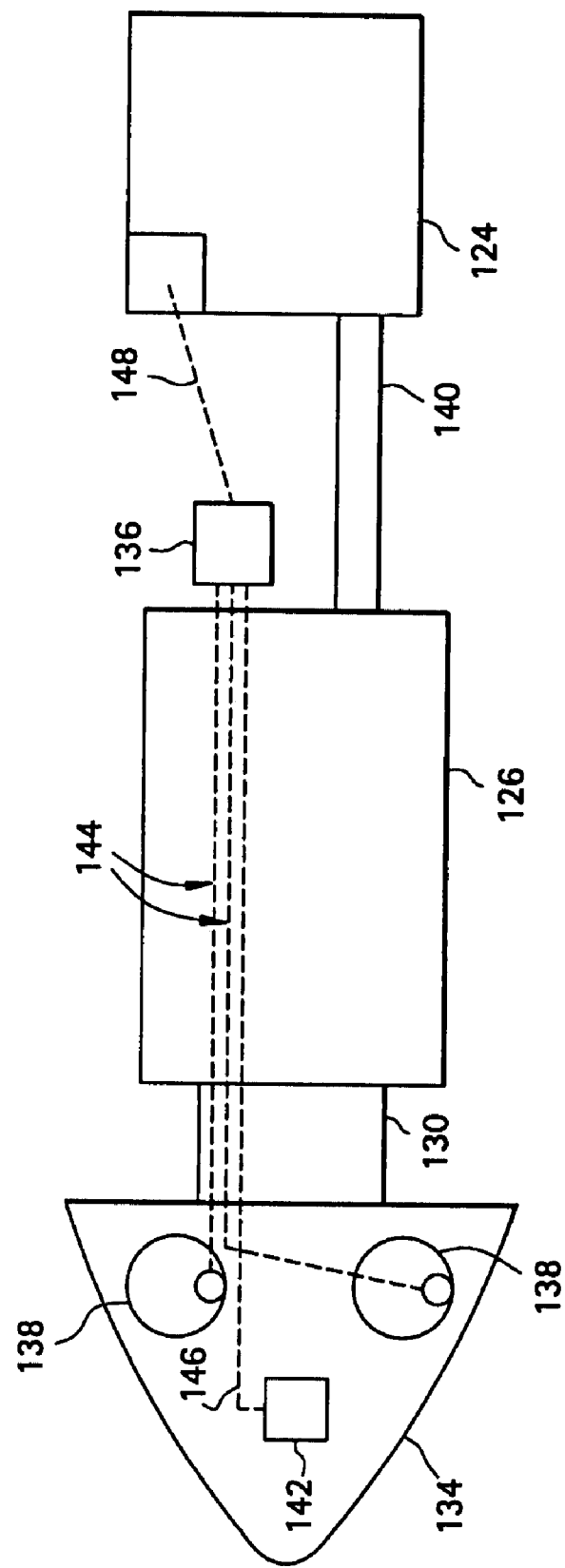

WIND TURBINE ASSEMBLIES AND SLIP RING ASSEMBLIES FOR WIND BLADE PITCH CONTROL MOTORS

BACKGROUND OF THE INVENTION

The subject matter disclosed herein relates to slip rings for wind blade pitch control motors employed in wind turbines.

Most wind turbines are horizontal-axis propeller type systems. Vertical-axis systems, such as the eggbeater like Darrieus and S-rotor type Savonius type systems, are also utilized but are generally more expensive. A horizontal-axis wind turbine consists of a rotor, a gearbox, a generator, a mainframe, and, a generator frame. The rotor captures the kinetic energy of the wind and converts it into rotary motion to drive the generator. The rotor usually consists of two or three blades, with three blades being the more common configuration. A speed-enhancing gearbox is typically used to drive the generator. The gearbox is capable of taking the main rotor speed from 10 or 20 revolutions per minute (RPM) and enhancing it to 2000 or 3000 RPM for more efficient generator operation.

Pitch control is a mechanism to prevent turbine rotor overspeed and potential damage to the turbine. A slip ring assembly is commonly used to control pitch. The slip ring assembly generally includes three high current rotors and numerous small, low current, rotors. The rated capacity of the high current rotors is typically 50 amps at 400 volts. A pitch controller box (the "black box") contains the logic circuitry that controls the pitch of the blades and is typically placed inside the rotor and receives input signals from the smaller rotors on the slip ring. The slip ring assembly for the pitch control is attached to the back of the gearbox with brackets and senses turbine rotor speed from a shaft within the gearbox. When the pitch controller box senses over-speed from the slip ring's output, it signals the pitch control motors, also located in the turbine hub, to change the pitch of the turbine blades, thereby reducing turbine rotor speed. It does this without twisting the electrical output wires from the machine. The output from the high current slip ring rotors goes to the pitch control motors. The input to the slip rings is from the gearbox shaft that senses real-time turbine rotor speed.

One of the problems with current wind turbines that employ slip rings for pitch control is wear, which can result in wind turbine failures due to arcing between electrical inputs. These failures result in turbine down time, which means a loss in revenue stream for turbine owners in addition to the cost for replacing failed hardware. Prior art repair methods generally include replacing the electrical inputs.

Accordingly, there remains a need in the art for improved slip rings that are less prone to wear and minimize the need to replace the electrical inputs.

BRIEF DESCRIPTION OF THE INVENTION

Disclosed herein are slip ring assemblies for blade pitch control, and wind turbines employing the same. In one embodiment, the slip ring assembly comprises a rotating portion comprising a series of grooves disposed about an outer perimeter of a ring, each one of the grooves comprising a first planar surface intersecting with a second planar surface at an angle of 75 to 105 degrees relative to one another, and a concavely rounded bottom portion at the intersection of the first and planar surfaces; and a stationary portion in operative communication with the rotating portion.

A wind turbine comprises a nacelle housing a wind driven generator or alternator mounted onto a tower; at least one wind driven blade operatively coupled to the wind driven generator or alternator; and a slip ring assembly disposed within the nacelle for controlling pitch of the at least one wind driven blade, the slip ring assembly comprising a rotating portion and a stationary portion, wherein the rotating portion comprises a series of grooves for receiving a spring loaded electrical contact disposed about an outer perimeter of the slip ring rotating portion, each one of the grooves comprising a first planar surface intersecting with a second planar surface, and a concavely rounded bottom portion at the intersection of the first and planar surfaces.

In another embodiment, the wind turbine comprises a nacelle housing a wind driven generator or alternator mounted onto a tower; at least one wind driven blade operatively coupled to the wind driven generator or alternator; and a slip ring assembly disposed within the nacelle and configured for controlling the pitch of the at least one wind driven blade, the slip ring assembly comprising a rotating portion and a stationary portion, wherein the rotating portion comprises a series of grooves for receiving a spring loaded electrical contact disposed about an outer perimeter of the slip ring rotating portion, wherein the rotating portion is formed of bronze and further comprises a graphite coating thereon.

The above described and other features are exemplified by the following Figures and detailed description.

BRIEF DESCRIPTION OF THE DRAWINGS

Referring now to the figures wherein like elements are numbered alike:

FIGS. 5 and 6 illustrate an exemplary wind turbine.

DETAILED DESCRIPTION OF THE INVENTION

Disclosed herein are slip rings for pitch control motors, such as those employed in wind turbines. The slip rings are generally configured to transfer electrical power to pitch control motors located inside the turbine hub to pitch the blades when the wind speed becomes excessive. One side of the slip ring is kept stationary—in this case, connected to the high-current wires that go to the pitch control motor and low-current wires that go to the pitch controller box, while the other side can rotate freely into which the wires from the wind turbine gearbox shaft are connected. The slip ring is mounted on an insulated shaft with the electrical connections from the wind turbine made to a conductive ring that is free to rotate. Electrical input wires maintain contact with the slip ring by spring pressure and remain in constant contact with the ring rubbing against it as it rotates.

Figure 1:
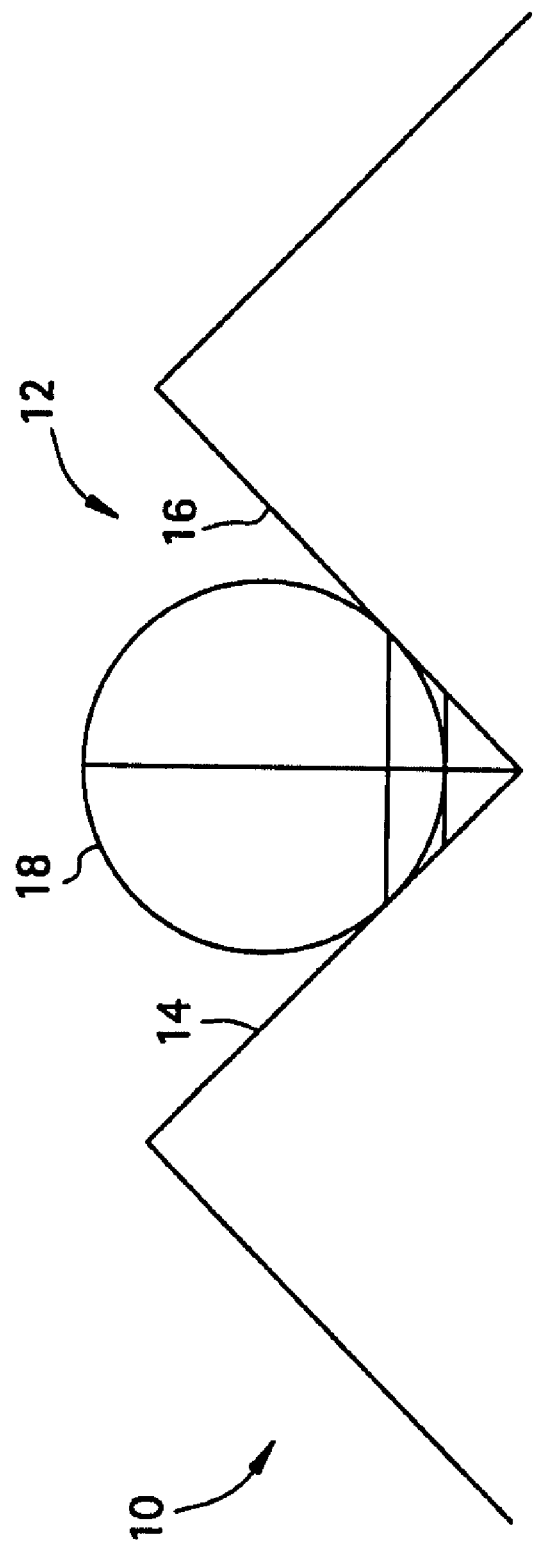
FIG. 1 illustrates a sectional profile of a v-grooved prior art slip ring.
Figure 2:
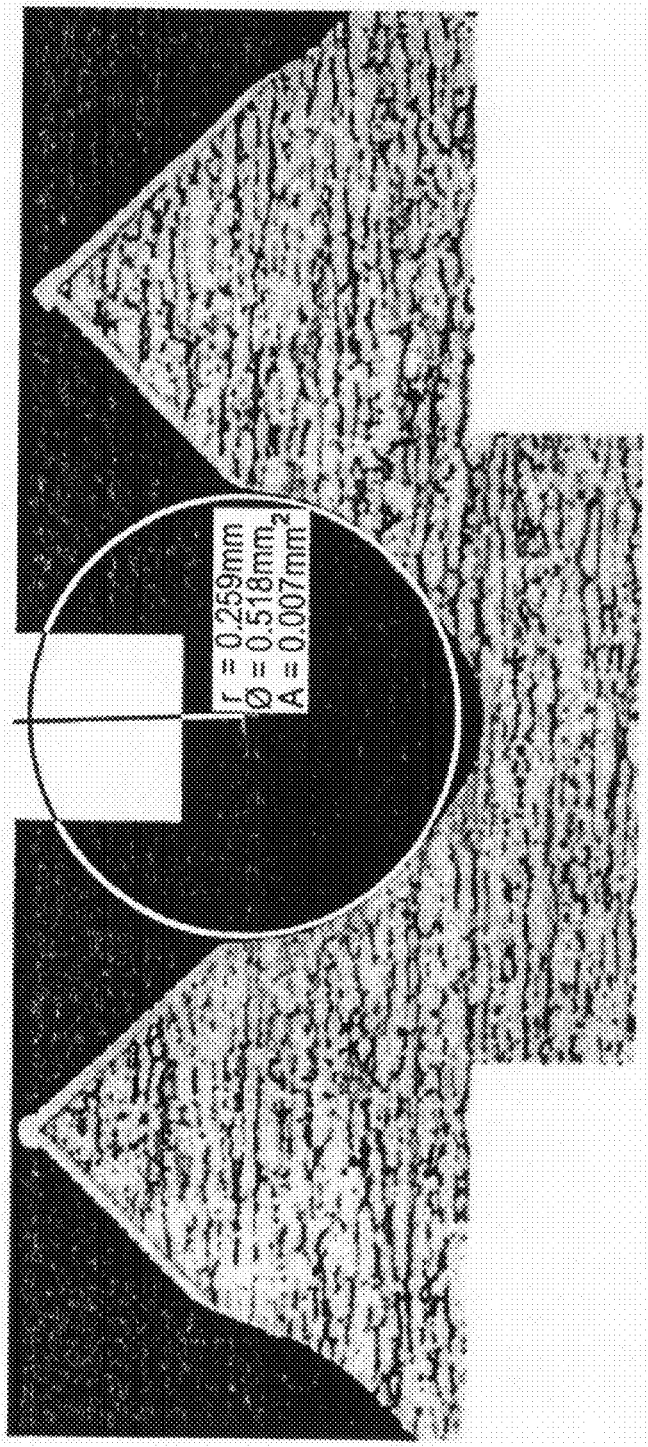
FIG. 2 illustrates a sectional profile of v-grooved prior art slip ring showing a wear pattern caused by high pressure contact form a spring loaded electrical input wire.
Figure 3:
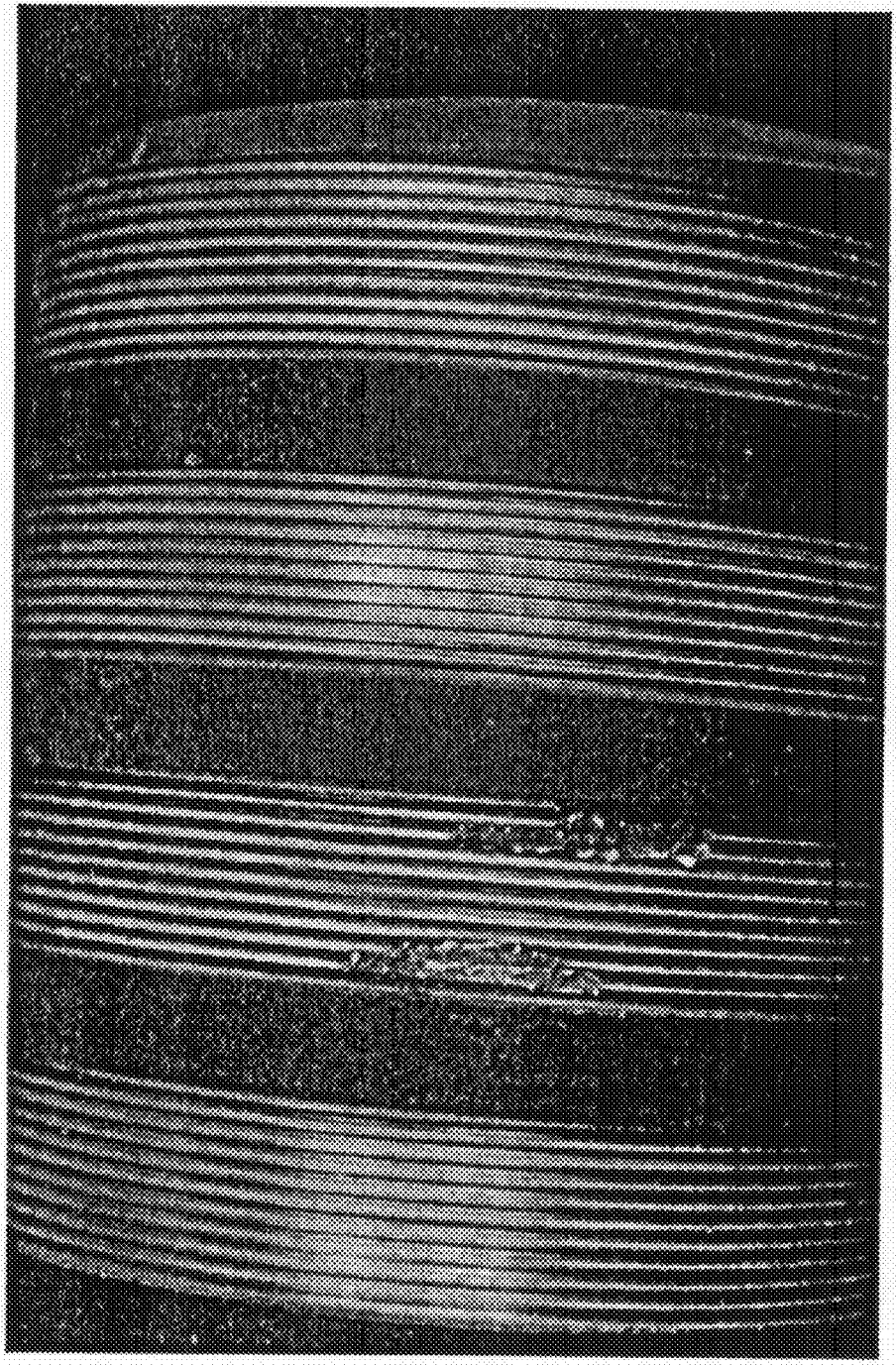
FIG. 3 pictorially illustrates slip ring failure in the form of localized melting due to arcing between electrical input wires and v-grooves.

FIG. 1 illustrates a prior art sectional view of a slip ring assembly, generally designated by reference numeral 10. The slip ring assembly includes v-shaped grooves 12. That is, each groove includes a first planar surface 14 and a second planar surface 16 that are typically disposed at angles θ of about 115 to 65 degrees relative to one another. The slip ring is typically formed of a brass material and is gold plated. During operation, the electrical input wires 18, which are typically formed of gold, palladium, and silver alloy because of their desirable electrical properties, maintain multiple line contact points as shown within the groove by spring pressure. However, it has been discovered that slip ring wear results in a gap being formed between the electrical input wires and the groove, which results in arcing between grooves. The arcing can cause portions of the slip ring to melt. It is believed that the line contact results in high contact pressure, theoretically infinite pressure if the two contacting bodies are extremely rigid, which results in excessive wear. A typical wear pattern is provided in FIG. 2. This wear surface offers sufficient spring relaxation to create a gap and subsequent arcing and local melting as shown in FIG. 3.

The current method for slip ring fabrication is to utilize a ring formed of brass as noted above to which v-shaped grooves are machined thereon. Then the slip ring is coated in gold. The gold coating is believed to provide better electrical contact with the electrical input wires. In the present disclosure, the slip ring is formed of bronze. Bronze is any of a broad range of copper alloys, usually with tin as the main additive, but sometimes with other elements such as phosphorous, manganese, aluminum, or silicon. In contrast, brass is a subset of copper alloys in which zinc is the principal additive. As used herein, the term "bronze" refers to copper alloys that are substantially free from zinc.

Figure 4:
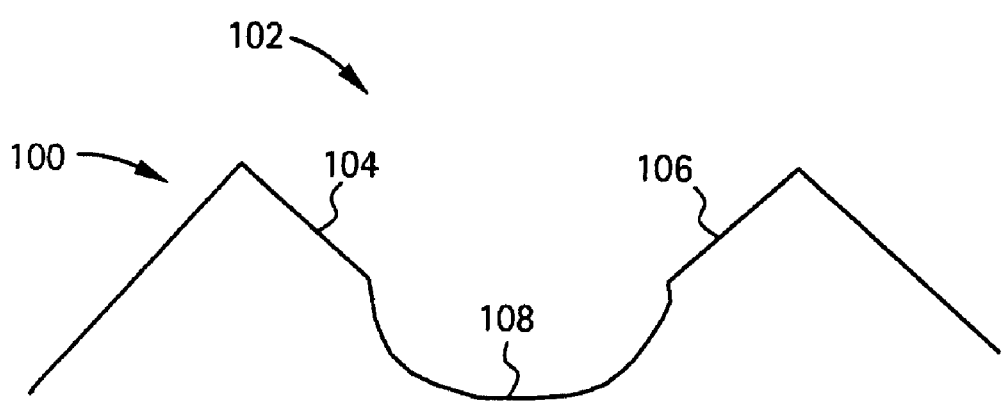
FIG. 4 illustrates a sectional view of a slip ring having contoured grooves.
Figure 4:
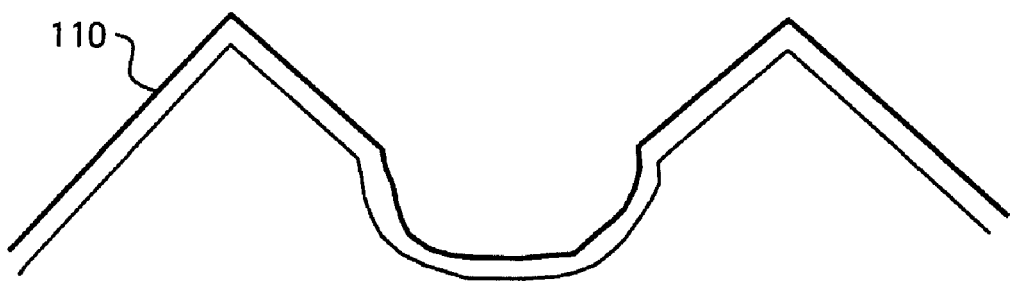

Referring now to FIG. 4, there is shown a sectional view of a slip ring assembly 100 in accordance with the present disclosure. The ring assembly includes a rotating portion in operative communication with a stationary portion (not shown), wherein the rotating portion includes modified v-shaped grooves, wherein the modification includes a concave bottom portion. The rotating potion of the ring assembly 100 comprises a series of modified v-shaped grooves 102 disposed about an outer perimeter of the ring, each one of the grooves comprising a first planar surface 104 intersecting with a second planar surface 106 at angles of 75 degrees to 105 degrees, and a concavely rounded bottom portion 108 at about the intersection of the first and planar surfaces 104, 106, wherein the ring is formed of the bronze material. The concave bottom portion provides increased contact surface area, which translates to reduced contact pressure of the electrical input wires. Increasing the contacting surface area from the conventional line contact to that provided by the concave bottom should result in a reduction in wear of 30 to 50%.

In one embodiment, the ring is coated with a graphite coating 110 to further improve lubricity. By way of example, the graphite can be coated onto the bronze electrolytically in a conventional manner. The thickness of the coating is 0.0001-inches to 0.0003-inches. In other embodiments, the thickness of the coating is 0.0003-inches to 0.001-inches. Advantageously, the use of graphite lowers cost relative to gold and also provides improved current flow.

The electrical input wires are formed of the gold-palladium-silver alloy electrical input wire because of its desirable electrical characteristics.

Figure 5:
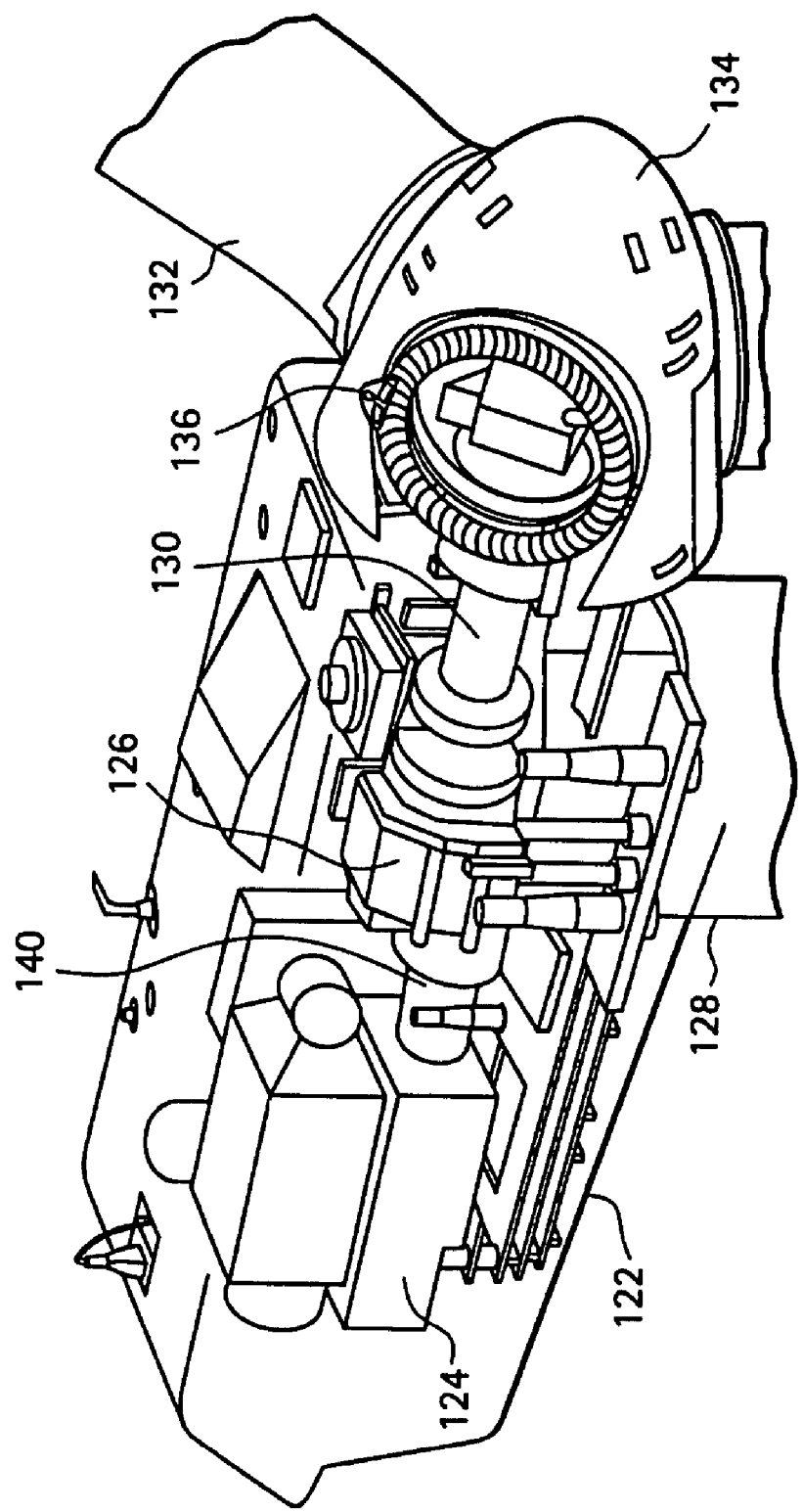

Referring now to FIGS. 5 and 6, there is provided an exemplary wind turbine for illustrative purposes. The wind turbine 120 generally includes a nacelle 122, which is a housing that contains a wind driven alternator or generator 124 (also referred to as the mainframe), a gearbox 126 to drive the generator, and a tower 128 to which the nacelle 122 is rotatably mounted. Yaw bearings (not shown) allow the wind turbine to freely pivot around the top of the tower 128, so that the rotor blades 132 will face into the wind. The gearbox 126 is in operative communication with a rotatable shaft 130, which is driven by wind-powered rotation of turbine blades 132 (two of which are partially shown) mounted to a nose cone 134. The gearbox 126 is coupled to the generator 124 via a coupler 140 to drive the generator so as to permit conversion of the kinetic energy provided by rotation of the blades 132.

As shown more clearly in FIG. 6, a slip ring assembly 136 (as shown in FIG. 6) for pitch control motors 138 is attached to the back of the gearbox 126 with brackets and senses turbine rotor speed from a shaft (not shown) within the gearbox 124. The slip ring assembly 136 includes a rotating portion that rotates at the same speed as the rotor. The slip ring assembly contains three high current rotors and numerous small, low current, rotors. The high current outputs 144 goes to the pitch controller motors 138 and the low current output 146 to a pitch controller box 142. The pitch controller box 142 (i.e., the "black box") contains the logic circuitry that controls the pitch of the blades and is placed inside the rotor. When the pitch controller box 142 senses over-speed from the slip ring's output, it signals the pitch control motors 138, located in the turbine hub within the nose cone 134, to change the pitch of the turbine blades 132, thereby reducing turbine rotor speed. It does this without twisting the electrical output wires from the machine. The output from the high current slip ring rotors goes to the pitch control motors. The slip ring inputs 148 are in electrical communication with the generator. The rated capacity of the high current rotors is typically 50 amps at 400 volts. At times, the current may exceed 50 amps.

This written description uses examples to disclose the invention, including the best mode, and also to enable practice of the invention, including making and using any devices or systems and performing any incorporated methods. The patentable scope of the invention is defined by the claims, and may include other examples. Such other examples are intended to be within the scope of the claims if they have structural elements that do not differ from the literal language of the claims, or if they include equivalent structural elements with insubstantial differences from the literal languages of the claims.

The invention claimed is:

1. A slip ring assembly, comprising:
    a rotating portion comprising a series of grooves disposed about an outer perimeter of a ring, each one of the grooves comprising a first planar surface intersecting with a second planar surface at an angle of 75 to 105 degrees relative to one another, and a concavely rounded bottom portion at the intersection of the first and second planar surfaces; and
    a stationary portion in operative communication with the rotating portion.

2. The slip ring assembly of claim 1, wherein the ring is formed of a bronze material.

3. The slip ring assembly of claim 2, wherein the bronze material comprises a copper and tin alloy.

4. The slip ring assembly of claim 1, further comprising a graphite coating disposed on the grooves.

5. The slip ring assembly of claim 4, wherein the graphite coating is at a thickness of 0.001 to 0.0003 inches.

6. The slip ring assembly of claim 1, further comprising output wires electrically coupled to the stationary portion, wherein the output wires are formed of a gold-palladium-silver alloy.

7. A wind turbine comprising the slip ring assembly of claim 1, wherein output wires are electrically coupled to a pitch controller and a pitch control motor.

8. A wind turbine assembly, comprising:
    a nacelle housing a wind driven generator or alternator mounted onto a tower;
    at least one wind driven blade operatively coupled to the wind driven generator or alternator; and a slip ring assembly disposed within the nacelle for controlling pitch of the at least one wind driven blade, the slip ring assembly comprising a rotating portion and a stationary portion, wherein the rotating portion comprises a series of grooves for receiving a spring loaded electrical contact disposed about an outer perimeter of the slip ring rotating portion, each one of the grooves comprising a first planar surface intersecting with a second planar surface, and a concavely rounded bottom portion at the intersection of the first and second planar surfaces, wherein the first planar surface is disposed at an angle of 75 to 105 degrees relative to the second planar surface.

9. The wind turbine assembly of claim 8, wherein the slip ring is formed of a bronze material.

10. The wind turbine assembly of claim 8, wherein the stationary portion further comprises wires in electrical communication with an external load.

11. The wind turbine assembly of claim 10, wherein the external load comprises a pitch controller box and pitch control motors.

12. The wind turbine assembly of claim 10, wherein the wires are formed of a gold-palladium-silver alloy.

13. The wind turbine assembly of claim 8, further comprising a graphite coating disposed on a surface of the rotating portion of the slip ring.

14. The wind turbine assembly of claim 13, wherein the graphite coating is at a thickness of 0.001 to 0.0003 inches.

15. The wind turbine assembly of claim 8, wherein the slip ring rotating portion rotates at a rotational speed equal to the at least one turbine blade.

16. A wind turbine assembly, comprising:
   a nacelle housing a wind driven generator or alternator mounted onto a tower;
   at least one wind driven blade operatively coupled to the wind driven generator or alternator; and
   a slip ring assembly disposed within the nacelle and configured for controlling the pitch of the at least one wind driven blade, the slip ring assembly comprising a rotating portion and a stationary portion, wherein the rotating portion comprises a series of grooves for receiving a spring loaded electrical contact disposed about an outer perimeter of the slip ring rotating portion, each one of the series of grooves comprises a first planar surface intersecting with a second planar surface at an angle of 75 to 105 degrees relative to one another, and a concavely rounded bottom portion at the intersection of the first and second planar surfaces, and wherein the rotating portion is formed of bronze and further comprises a graphite coating thereon.

17. The wind turbine assembly of claim 16, wherein the graphite coating is at a thickness of 0.001 to 0.0003 inches.

\* \* \* \* \*